United States Patent
Hing et al.

(10) Patent No.: US 9,793,551 B2
(45) Date of Patent: Oct. 17, 2017

(54) CU-BASED CERMET MATERIALS FOR SOLID OXIDE FUEL CELLS

(71) Applicant: UNIVERSITI BRUNEI DARUSSALAM, Gadong (BN)

(72) Inventors: Peter Hing, Gadong (BN); Lim Chee Ming, Gadong (BN); Khan Muhammad Naeem, Gadong (BN)

(73) Assignee: Universiti Brunei Darussalam, Gadong (BN)

(*) Notice: Subject to any disclaimer, the term of this patent is extended or adjusted under 35 U.S.C. 154(b) by 161 days.

(21) Appl. No.: 14/276,316

(22) Filed: May 13, 2014

(65) Prior Publication Data

US 2014/0342270 A1    Nov. 20, 2014

(30) Foreign Application Priority Data

May 17, 2013  (BN) .................................. 2013/0041

(51) Int. Cl.
    *H01M 4/90*    (2006.01)
    *H01M 8/124*   (2016.01)

(52) U.S. Cl.
    CPC .. *H01M 4/9066* (2013.01); *H01M 2008/1293* (2013.01)

(58) Field of Classification Search
    CPC .................................................. H01M 4/9066
    See application file for complete search history.

(56) References Cited

U.S. PATENT DOCUMENTS

| | | | |
|---|---|---|---|
| 6,090,500 A * | 7/2000 | Ishihara .............. | B01D 71/024 204/295 |
| 6,165,431 A * | 12/2000 | Mackay .............. | B01D 53/228 423/219 |
| 7,838,166 B2 | 11/2010 | Matsuzaki et al. | |
| 2003/0035989 A1* | 2/2003 | Gorte ................. | H01M 4/8621 429/486 |
| 2004/0166380 A1* | 8/2004 | Gorte ................. | H01M 4/8652 429/489 |
| 2004/0247791 A1 | 12/2004 | Hu et al. | |
| 2007/0117006 A1 | 5/2007 | Zhan et al. | |
| 2008/0286625 A1 | 11/2008 | Sarkar et al. | |

(Continued)

FOREIGN PATENT DOCUMENTS

| IN | 244888 B | 12/2010 |
|---|---|---|
| IN | 2010 03111 P2 | 11/2011 |
| JP | 2007-042422 A | 2/2007 |

(Continued)

OTHER PUBLICATIONS

Ghazanfar, A., et al., "Study of CuNiZnGdCe-Nanocomposite Anode for Low Temperature SOFC," *Nanoscience and Nanotechnology Letters*, 2012, vol. 4, pp. 389-393.

(Continued)

*Primary Examiner* — Alex A Rolland
(74) *Attorney, Agent, or Firm* — Geeta Kadambi; Riddhi IP LLC

(57) ABSTRACT

The present invention relates to a cermet body composition for the preparation of novel cermet materials to be used in solid oxide fuel cells. The cermet body composition comprises a ceramic component and a metallic component, wherein the ceramic component is in the range of 5% to 95% by wt of the cermet body.

12 Claims, 10 Drawing Sheets

(56) References Cited

U.S. PATENT DOCUMENTS

2009/0053089 A1     2/2009   Yang et al.
2011/0217623 A1     9/2011   Jiang et al.

FOREIGN PATENT DOCUMENTS

| | | |
|---|---|---|
| KR | 10-0804481 B1 | 2/2008 |
| KR | 10-2011-0051955 A | 5/2011 |
| WO | WO 2004/012287 A2 | 2/2004 |
| WO | WO 2010/066444 A1 | 6/2010 |
| WO | WO 2012/133438 A1 | 10/2012 |

OTHER PUBLICATIONS

Ouzaouit, K., et al., "Electrical conductivity of $BaCeO_3$ synthesized by new sol-gel method," *M. J. Condensed Mater*, 2006, vol. 7, No. 1, pp. 94-97.

\* cited by examiner

CU-BASED CERMET MATERIALS FOR SOLID OXIDE FUEL CELLS

CROSS-REFERENCE TO RELATED APPLICATION

This application claims priority to Brunei Patent Application No. 2013/0041, filed May 17, 2013, which is hereby incorporated by reference in its entirety.

FIELD OF THE INVENTION

The present invention relates to the novel cermet materials to be used in solid oxide fuel cells. It also relates to the method for preparing a cermet body comprising ceramics having a metallic loading.

BACKGROUND OF THE INVENTION

Solid Oxide Fuel Cell (SOFC) is an electrochemical device which converts chemical energy into electrical energy without Carnot limitation. Among various electrochemical devices, it has the highest efficiency of fuel conversion into electricity. There is no liquid electrolyte, thereby eliminating the metal corrosion and electrolyte management problems typically associated with the use of liquid electrolytes. Rather, the electrolyte of the cells is made primarily from solid ceramic materials that are capable of surviving the high temperature environment typically encountered during operation of solid oxide fuel cells. The high operating temperatures limit the materials used to fabricate the respective Solid Oxide Fuel Cell (SOFC) components by chemical stability in oxidizing and reducing environments, chemical stability of contacting materials, conductivity, and thermo-mechanical compatibility.

Mostly hydrogen is used as a fuel in SOFCs. However, the hydrogen fuel needs to be replaced for its commercialization by other hydrocarbons due to its high cost and storage issues. Another example is methane which can be internally reformed at high temperature 700-1000° C. by anode material and hence can be used as a fuel. However, high operating temperatures put very severe requirements on the use of methane as a fuel.

Metal based cermets like Ni-based cermets and Ni—YSZ cermets are known in the prior art for use in the Solid Oxide Fuel Cell (SOFC). One major disadvantage of these materials is carbon formation when used with hydrocarbon fuel. Other cermets known in the prior art has relatively lower sulphur tolerance, low stability during adverse conditions and the performance was not adequate.

Hence, there is need to provide a cermet body composition which is stable and exhibits an improved performance while being used as an anode material in Solid Oxide Fuel Cell (SOFC).

SUMMARY OF THE INVENTION

It is an object of the invention, to provide a cermet body composition comprising:
  a ceramic component comprising a mixture of at least four oxides selected from the group comprising of Barium oxide, Cerium oxide, Yttrium oxide, Zirconium oxide and Ytterbium oxide;
  a metallic component comprising at least one metal selected from the group consisting of Iron, Copper, Nickel, alloys of the aforementioned metals and mixtures thereof;
wherein the ceramic component is in the range of 5% to 95% by wt of the cermet body.

It is another object of the invention, to provide a cermet body composition comprising the metallic component in the range of 5%-50% by wt of the cermet body.

It is yet another object of the invention, to provide a cermet body composition comprising Barium oxide in the range of 20%-50% by wt of ceramic component.

It is yet another object of the invention, to provide a cermet body composition comprising Cerium oxide in the range of 35%-50% by wt of the ceramic component.

It is yet another object of the invention, to provide a cermet body composition comprising Yttrium oxide in the range of 10%-20% by wt of the ceramic component.

It is yet another object of the invention, to provide a cermet body composition comprising Zirconium oxide in the range of 5%-10% by wt of ceramic component.

It is yet another object of the invention, to provide a cermet body composition comprising Ytterbium oxide in the range of 10%-20% by wt of ceramic component.

It is yet another object of the invention, to provide a cermet body composition further comprising a porogen selected from starch and flour.

It is yet another object of the invention, to provide a method for preparing a cermet body comprising a ceramic component and a metallic component, wherein the method is characterized in the steps comprising:
  a. Weighing and calcinating the ceramic component, wherein the ceramic component comprises a mixture of at least four oxides selected from the group consisting of Barium oxide, Cerium oxide, Yttrium oxide, Zirconium oxide and Ytterbium oxide;
  b. Milling the ceramic component in an organic solvent with a milling media followed by drying;
  c. Calcinating the dried ceramic component;
  d. Repeating the steps (b) and (c) to form a calcined ceramic powder;
  e. Mixing the calcined ceramic powder with a porogen to form a porous ceramic powder;
  f. Mixing the porous ceramic powder with the calcined ceramic powder by uniaxial compaction to form a porous-dense-porous ceramic body followed by Sintering;
  g. Impregnating the sintered ceramic body with the metallic component to form a cermet body, wherein the metallic component comprises at least one metal selected from the group consisting of Iron, Copper, Nickel, alloys of the aforementioned metals and mixtures thereof;
wherein the ceramic component is in the range of 5% by wt to 95% by wt of the cermet body.

It is yet another object of the invention, to provide a cermet body having porosity in the range of 35%-48%.

It is yet another object of the invention, to provide a ceramic based anode material with metallic loading for use in Solid Oxide Fuel Cell (SOFC).

It is yet another object of the invention, to provide a cermet body which has potential for use in low and intermediate temperature solid oxide fuel cells (SOFCs) for direct hydrocarbon fuels.

It is yet another object of the invention, to provide a cermet body having conductivity in the range of 60-80 S/cm at a temperature of 600-650° C.

It is yet another object of the invention, to provide a cermet body having resistivity in the range of 1.3-1.6 $\Omega \cdot m$ at a temperature of 600-650° C.

It is yet another object of the invention, to provide a cermet body having an average pore size of 2 μm.

BRIEF DESCRIPTION OF THE DRAWINGS

Embodiments of the present invention hereinafter described in conjunction with the appended drawings are provided to illustrate and not to limit the present invention, wherein like designations denote like elements, and in which.

DETAILED DESCRIPTION OF THE DISCLOSURE

Figure 1:
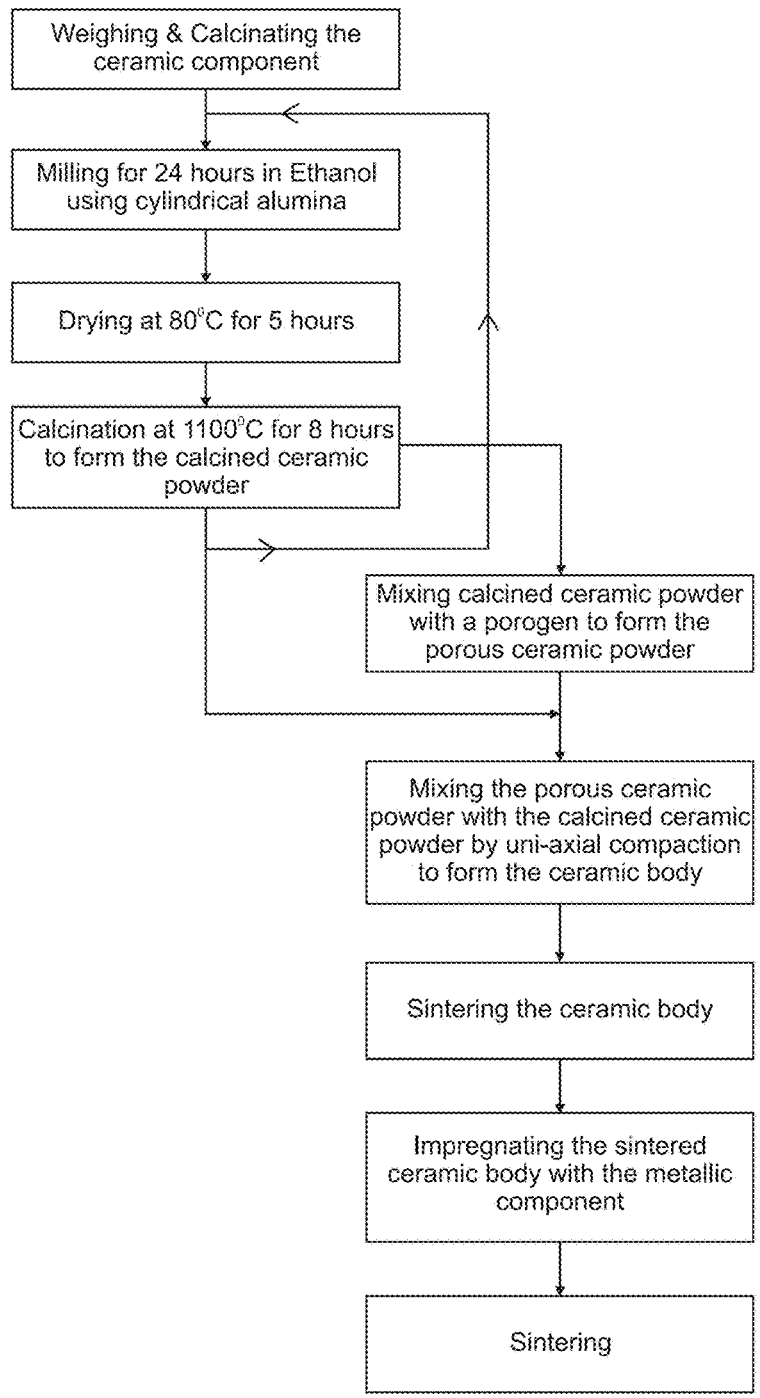
FIG. 1 illustrates the flowchart for the preparation of cermet body.

In the detailed description of the present invention, numerous specific details are described to provide a thorough understanding of the various embodiments of the present invention. However, a person skilled in the relevant art will recognize that an embodiment of the present invention can be practiced without one or more of the specific details, or with other apparatuses, systems, assemblies, methods, components, materials, parts, and/or the like. In other instances, well-known structures, materials, or operations are not specifically shown or described in detail to avoid obscuring aspects of embodiments of the present invention.

It must be noted that as used herein and in the appended claims, the singular forms "a", "an", and "the" include plural referents unless the context clearly dictates otherwise. Thus, for example, reference to "an individual" includes one or more individuals and reference to "the method" includes reference to equivalent steps and methods known to those skilled in the art, and so forth.

The invention relates to a novel cermet body composition to be used in solid oxide fuel cell. The cermet body composition comprises a ceramic component and a metallic component. The ceramic component comprises a mixture of at least four oxides selected from the group comprising of Barium oxide, Cerium oxide, Yttrium oxide, Zirconium oxide and Ytterbium oxide, wherein the metallic component comprises at least one metal selected from the group consisting of Iron, Copper, Nickel, alloys of the aforementioned metals and mixtures thereof. The ceramic component is in the range of 5% by wt to 95% by wt of the cermet body wherein the cermet body is prepared by impregnating the ceramic component with the metallic component.

In an embodiment of the invention, the metallic component may vary from as low as 5% by wt to 50% by wt of the cermet body. The metallic component is impregnated with the ceramic component to form the cermet body.

In another embodiment of the invention, the cermet body composition comprises Barium oxide in the range of 20% by wt-50% by wt of the ceramic component.

In another embodiment of the invention, the cermet body composition comprises Cerium oxide in the range of 35% by wt-50% by wt of the ceramic component.

In yet another embodiment of the invention, the cermet body composition comprises Yttrium oxide in the range of 10% by wt-20% by wt of the ceramic component.

In yet another embodiment of the invention, the cermet body composition comprises Zirconium oxide in the range of 5% by wt-10% by wt of the ceramic component.

In yet another embodiment of the invention, the cermet body composition comprises Ytterbium oxide in the range of 10%-20% by wt of ceramic component.

In an exemplary embodiment of the invention, the cermet body composition comprises 20% by wt Cu and 80% by wt ceramic component consisting of 46% by wt BaO, 36% by wt $CeO_2$, 14% by wt $Y_2O_3$ and 4% by wt $ZrO_2$.

In another exemplary embodiment of the invention, the cermet body composition comprises 25% by wt Cu and 75% by wt ceramic component consisting of 46% by wt BaO, 36% by wt $CeO_2$, 14% by wt $Y_2O_3$ and 4% by wt $ZrO_2$.

In another exemplary embodiment of the invention, the cermet body composition comprises 30% by wt Cu and 70% by wt ceramic component consisting of 46% by wt BaO, 36% by wt $CeO_2$, 14% by wt $Y_2O_3$ and 4% by wt $ZrO_2$.

In another exemplary embodiment of the invention, the cermet body composition comprises 35% by wt Cu and 65% by wt ceramic component consisting of 46% by wt BaO, 36% by wt $CeO_2$, 14% by wt $Y_2O_3$ and 4% by wt $ZrO_2$.

In another exemplary embodiment of the invention, the cermet body composition comprises 20% by wt Cu and 80% by wt ceramic component consisting of 46% by wt BaO, 36% by wt $CeO_2$, 14% by wt $Yb_2O_3$ and 10% by wt $ZrO_2$.

In another exemplary embodiment of the invention, the cermet body composition comprises ceramic component consisting of 41% by wt BaO, 31% by wt $CeO_2$, 14% by wt $Y_2O_3$, 10% by wt $Yb_2O_3$ and 10% by wt $ZrO_2$ wherein the ceramic component is in the range of 5% by wt to 95% by wt of the cermet body. Further, the addition of ytterbium oxide in the ceramic component has beneficial effects as it enhances the sintering behaviour of the ceramics formed by the composition of the invention.

In another exemplary embodiment of the invention, the cermet body composition further comprises a porogen selected from flour or starch.

In yet another embodiment of the invention, the porosity of the cermet body is in the range of 35%-48%.

The invention also relates to a method for preparing the cermet body comprising the ceramic component and the metallic component, wherein the method is characterized in the steps comprising:

a. Weighing and calcinating the ceramic component, wherein the ceramic component comprises a mixture of at least four oxides selected from the group consisting of Barium oxide, Cerium oxide, Yttrium oxide, Zirconium oxide and Ytterbium oxide;

b. Milling the ceramic component in an organic solvent with a milling media followed by drying;

c. Calcinating the dried ceramic component;

d. Repeating the steps (b) and (c) to form a calcined ceramic powder;

e. Mixing the calcined ceramic powder with a porogen to form a porous ceramic powder;

f. Mixing the porous ceramic powder with the calcined ceramic powder by uniaxial compaction to form a porous-dense-porous ceramic body followed by Sintering; and g. Impregnating the sintered ceramic body with the metallic component to form a cermet body, wherein the metallic component comprises at least one metal selected from the group consisting of Iron, Copper, Nickel, alloys of the aforementioned metals and mixtures thereof;

wherein the ceramic component is in the range of 5% by wt to 95% by wt of the cermet body.

FIG. 1 illustrates the flowchart for the method of preparation of cermet body. The ceramic materials are properly weighed to insure the specific compositions of each of the ceramic constituents which can have % by wt range specified as follows:

a) Barium oxide is in the range of 20% by wt-50% by wt of the ceramic component;
b) Cerium oxide is in the range of 35% by wt-50% by wt of the ceramic component;
c) Yttrium oxide is in the range of 10% by wt-20% by wt of the ceramic component;
d) Zirconium oxide is in the range of 5% by wt-10% by wt of the ceramic component;
e) Ytterbium oxide is in the range of 10% by wt-20% by wt of the ceramic component.

The ceramic component in its definite % by wt is mixed and calcinated. Further, milling of the ceramic component is carried out for 24 hours in an organic solvent with a milling media. The organic solvent can be selected from a group comprising of Methanol, Ethanol, Isopropyl alcohol and n-Butanol. The milling media can be selected from a group comprising of cylindrical alumina, lime, Cerium Zirconia Oxide Cylinders, Toughened Zirconia Silica, Flint Pebbles, Soda Lime Glass, Sand and Polystyrene. The milled ceramic component is dried in an oven at 80° C. to form a dried ceramic component. Drying is followed by calcination of the dried ceramic component at 1100° C. for duration of 8 hours in air. The aforementioned process of milling, drying and calcination improves the physical and chemical properties of the ceramic component. The ceramic component obtained after calcination is again processed using the steps of milling, drying and calcination to get a more rich and pure calcined ceramic powder.

In an embodiment of the invention, the processing steps of milling, drying in an oven and calcination at 1100° C. can be repeated any number of times until the required chemical and physical properties in the calcined ceramic powder is obtained.

A porogen is then added to the calcined ceramic powder to form a porous ceramic powder. The porogen adds porosity to the calcined ceramic powder and it can be selected from the group comprising of flour, starch, PVA or like.

In yet another embodiment of the invention, flour in the range of 5% by wt or 10% by wt of calcined ceramic powder is mixed to the calcined ceramic powder by uniaxial compaction to obtain the porous ceramic powder. The flour used in the invention is the commonly used flour for making bread and cake, it is understood that any type of flour being organic in nature can be deployed to form the interconnected porosity.

In yet another embodiment of the invention, starch in the range of 5% by wt or 10% by wt of calcined ceramic powder is added for creating pores.

The porous ceramic powder formed by adding the porogen is mixed with the calcined ceramic powder by uniaxial compaction to synthesize a porous-dense-porous ceramic body and sintered at 1500° C. for 3 to 5 hours in air.

In yet another exemplary embodiment of the invention, lithium oxide in the range of 5% by wt of the ceramic component is added to the ceramic component during calcination and milling to improve the efficiency of the sintering process that can be highly beneficial for the nanosize cermet body.

The sintered ceramic body is impregnated with the metallic component. The metallic component comprises at least one metal selected from the group consisting of Iron, Copper, Nickel, alloys of the aforementioned metals and mixtures thereof. The metallic component is in the range of 5% by wt-50% by wt of the cermet body and is impregnated in the sintered ceramic body as molten form or as soluble metallic salt.

In yet another embodiment of the invention, the mixture of soluble metallic salts such as nitrates or sulfates salts of more than one metal like copper, nickel and iron can be impregnated with the sintered ceramic body. For example, copper salts for e.g. sulfates or nitrates along with metallic salts of nickel or iron is impregnated in the sintered ceramic body to form the copper-nickel and copper-nickel-iron cermet body to be used in the solid oxide fuel cells.

In yet another embodiment of the invention, metal-organic precursors can be used for their subsequent impregnation with the sintered ceramic body.

In yet another exemplary embodiment of the invention, by repeated impregnation of sintered ceramic body with metallic component, conducting cermets for solid oxide fuel cells with as high as 15% by wt of metallic phase can be developed.

In yet another embodiment of the invention, after impregnation, sintering from 1350° C. to 1500° C. is done to synthesize the cermet body of the invention. Due to sintering, the metallic component fused with the sintered ceramic body to produce the cermet body.

In yet another embodiment of the invention, sintering of metal based cermet produces a chemically modified cermet body with metal oxides or metallic salts reduced to their metallic element.

In yet another embodiment of the invention, impregnation of the sintered ceramic body with the metallic component produces a highly porous sandwich structure with a dense metal based cermet in the middle and the porous ceramic component at the other end.

In yet another embodiment of the invention, the cermet body can be fabricated into tubular components for concentric design of solid oxide fuel cells.

In yet another embodiment of the invention, the porous cermet body can also be fabricated as thin plates by a variety of techniques including tape casting, slip casting, extrusion, screen printing, thermal spray coating.

In yet another embodiment of the invention, soluble copper precursors can be infiltrated in the porous ceramic component containing NiO, to form cermet with copper-nickel alloys after reduction in hydrogen, methane or butane flame. The other pure porous ceramic part of the sandwich structure can be incorporated with soluble precursors of cathode materials. Accordingly, a fuel cell element consisting of porous anode with Cu, Ni or Cu—Ni alloys, a solid oxide BZCYYb (Barium, Zirconium, Cerium, Yttrium, Ytterbium) electrolyte of 98% theoretical density, and a porous BZCYYb (Barium, Zirconium, Cerium, Yttrium, Ytterbium) ceramic impregnated with cathode inside the porous ceramic structure can be constructed this way. The cathode impregnated can be SDC (strontium oxide doped ceria) and LSM (Lanthanum oxide, Strontium Oxide and Manganese oxide.

The method of the present invention as described is cost effective, reproducible and sustainable. The method is industrially applicable and involves basic day-today ceramic materials as raw materials. The cermet body of the invention has potential for use in low and intermediate temperature solid oxide fuel cells (SOFCs) with improved efficiency. The electrical and thermal properties of the novel cermets, chemical stability in oxidizing and reducing environments, chemical stability of contacting materials, conductivity, and thermo-mechanical compatibility suggests that these materials have the potential to be used as an anode material for SOFCs.

The invention provides a ceramic based anode material with metallic loading for use in Solid Oxide Fuel Cell (SOFC). Further, the cermet body has the potential to be used in the solid oxide fuel cells (SOFCs) for direct hydrocarbon fuels.

In yet another embodiment of the invention, the cermet body synthesized is having conductivity in the range of 60-80 S/cm at a temperature of 600-650° C. which is the operating temperature of solid oxide fuel cells.

In yet another embodiment of the invention, the cermet body synthesized is having resistivity in the range of 1.3-1.6 $\Omega \cdot m$ at a temperature of 600-650° C.

In yet another embodiment of the invention, the porosity of the cermet body is in the range of 35%-48%. The grain size of the ceramics and metals are in the range of 2 to 5 μm and the interconnected porosity is in micron range.

Several variations in the methods herein disclosed will suggest themselves to those skilled in the art. However, it is to be understood that the present disclosure relates to the preferred embodiment of the invention which is for purposes of illustration only and not to be construed as limiting the scope of the invention.

The present invention will now be illustrated in greater detail with reference to Examples, but the present invention should not be interpreted as being restricted thereto.

EXAMPLES $BaCO_3$ from MERCK, $CeO_2$ from Aldrich, $Y_2O_3$ from MERCK, $ZrO_2$ from Riedel-de-Haen (Sigma Aldrich) were used as starting materials to form the ceramic component and $Cu_2O$ from Merck were used as the metallic component. Cuprous oxide ($Cu_2O$) was added to obtain 20% by wt, 30% by wt and 40% by wt Cu-cermets after reduction of $Cu_2O$/CuO to Cu metal. The constituents from various sources were mixed in distilled water. The mixture was milled in a horizontal ball mill for 24 hours using dense cylindrical alumina as milling media. After milling, the slurry was dried at 150° C. for 3 hours.

The 5% by wt and 10% by wt flour was added to the three samples for creating pores. Discs were fabricated using uniaxial compaction at 5000 psi. The pellets were sintered at 950° C. for 3 hours in air at a heating rate of 3° C./minute. After establishing the sinterability, porous cermets were fabricated.

Figure 2:
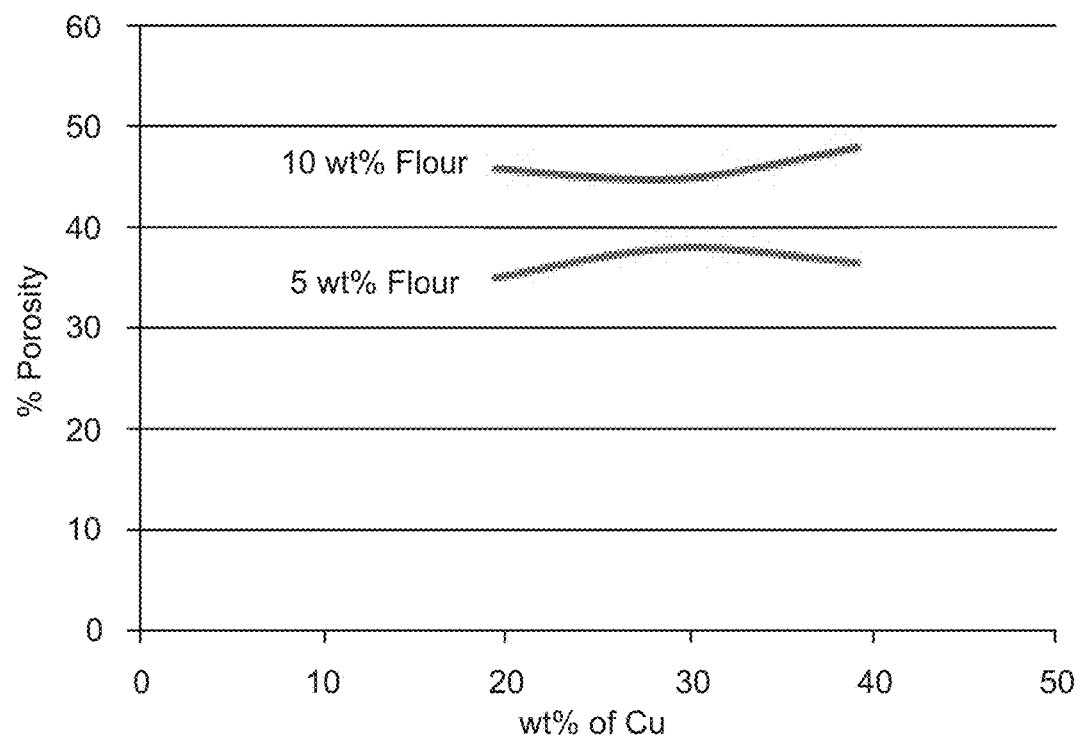
FIG. 2 illustrates the porosity of 20% by wt, 30% by wt and 40% by wt Cu-cermets with 5% by wt and 10% by wt flour sintered at 950° C. for 3 hours in air.

FIG. 2 illustrates the porosity of 20% by wt, 30% by wt and 40% by wt Cu-cermets with 5% by wt and 10% by wt flour sintered at 950° C. for 3 hours in air. The porosity for all Cu-cermets with 5% by wt flour was found to be in the range of 35-38% whereas the porosity for all Cu-cermets with 10% by wt flour was found to be in the range of 45-48% as shown in FIG. 2.

The shrinkage was measured and porosity was calculated from bulk and theoretical densities using the relation $\rho_{Bulk} = \rho_{Theoretical} (1-V_{fp})$, where $\rho_{Bulk}$ is Bulk density, $\rho_{Theoretical}$ Theoretical density and $V_{fp}$ is the volume fraction of pores.

Figure 3A:
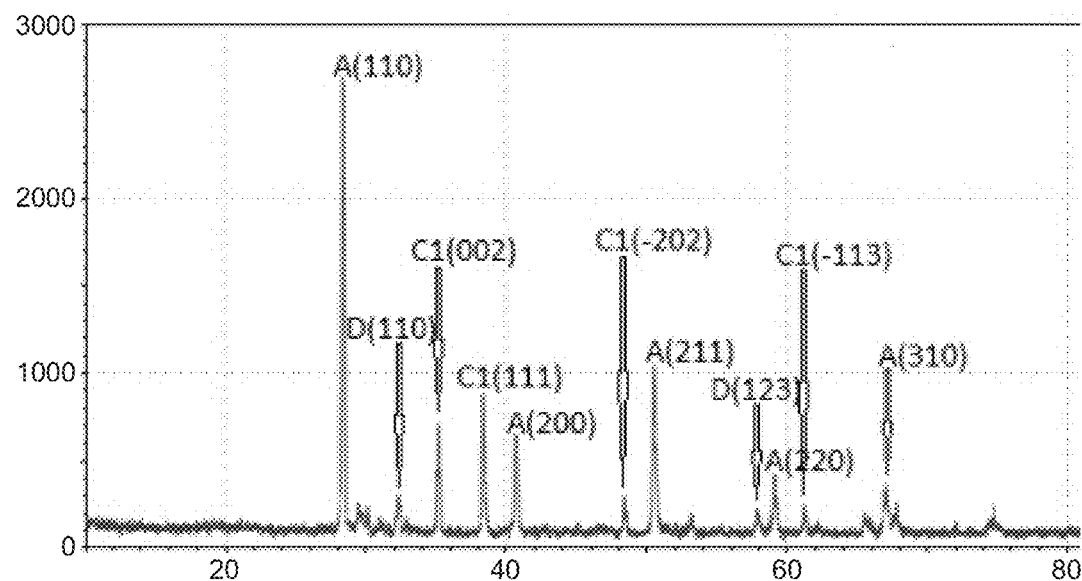
FIG. 3a illustrates the X-ray Diffractograms of 30% by wt Cu-cermet before sintering.
Figure 3B:
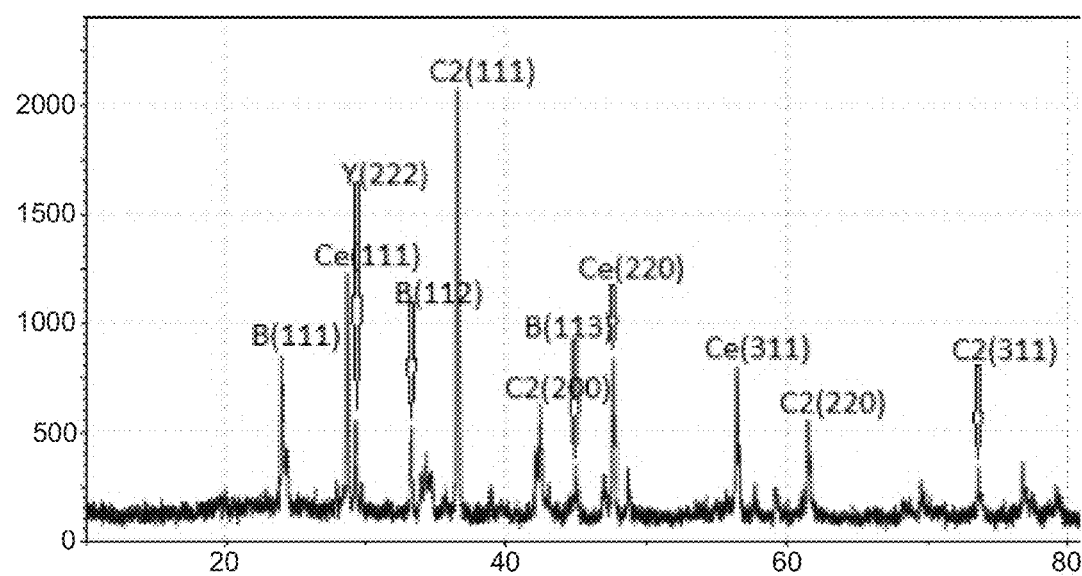
FIG. 3b illustrates the X-ray Diffractograms of 30% by wt Cu-cermet after sintering.

The XRD patterns of the sintered pellets were performed under the same conditions as the unsintered samples. To study the microstructure, the pellets were polished and then gold coated for 30 seconds. The XRD patterns of the powder samples were performed on Shimadzu −7000, X-Ray Diffractometer from 10-80° with a step angle of 0.02° and a scanning rate of 3° C./minute. FIG. 3a and FIG. 3b illustrates the X-ray Diffractograms of 30% by wt Cu-cermet before sintering and after sintering respectively. Notations for FIG. 3a and FIG. 3b are given below.

A. PDF Card-$BaCeO_3$-00-001-0803
B. PDF Card-$BaCO_3$-00-005-0378
C. PDF Card-CuO-01-070-6829
D. C2. PDF Card-$Cu_2O$-00-005-0667
E. Ce. PDF Card-$CeO_2$-01-071-480.
F. D.PDF Card-$Ba_2Cu_3YO_7$ 00-038-1433
G. Y. PDF Card-$Y_2O_3$-01-071-0049

The various phases identified before sintering were, $BaCO_3$, $CeO_2$, $Y_2O_3$ and $Cu_2O$. Although $ZrO_2$ was a constituent component, but it was not detected (only 2-3%), as any phase less than 5% cannot be detected by XRD.

Similarly major peaks detected after sintering were $BaCeO_3$, CuO and $Ba_2Cu_3YO_7$ as a minor peak. Two new phases $BaCeO_3$ (major phase) and $Ba_2Cu_3YO_7$ (minor phase) were formed as a result of chemical reaction during sintering. Also cuprous oxide ($Cu_2O$) was transformed in to cupric oxide (CuO) during sintering.

In all samples, CuO was reduced to Cu metal using a butane flame for 1 hour and then quickly dropped into ethanol in order to prevent re-oxidation of Cu to CuO. Again XRD was performed after reduction to confirm reduction of CuO to Cu. The SEM images were taken for comparison of microstructure before and after reduction.

Figure 4A:
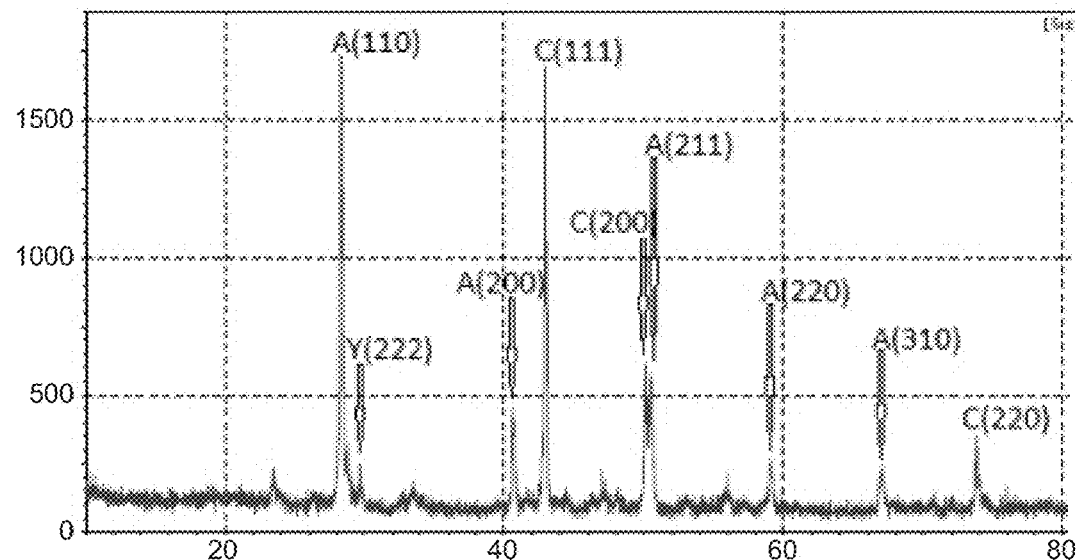
FIG. 4a illustrates the X-ray Diffractograms of 30% by wt Cu-cermet before flame reduction.
Figure 4B:
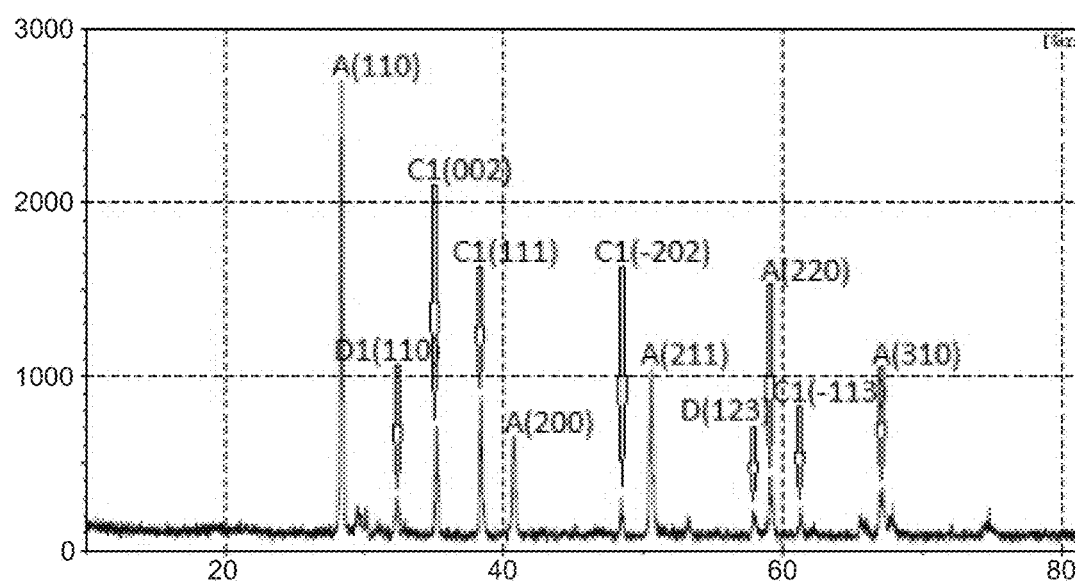
FIG. 4b illustrates the X-ray Diffractograms of 30% by wt Cu-cermet after flame reduction.
Figure 5A:
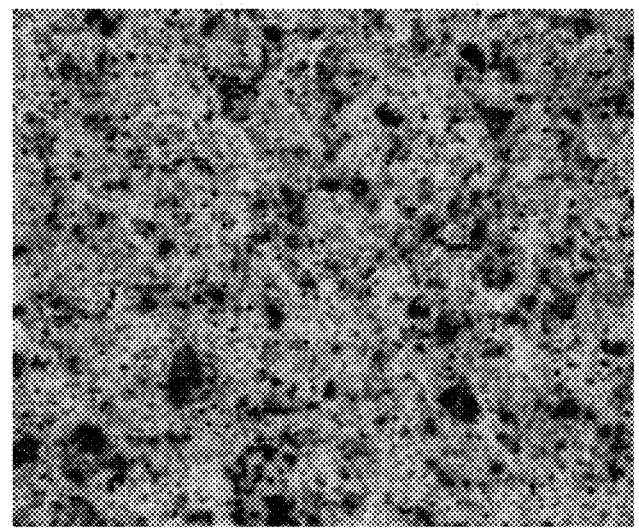
FIG. 5a illustrates the SEM image of 30% by wt Cu-cermet with 5% by wt flour before reduction, sintered at 950° C. for 3 hours in air.
Figure 5B:
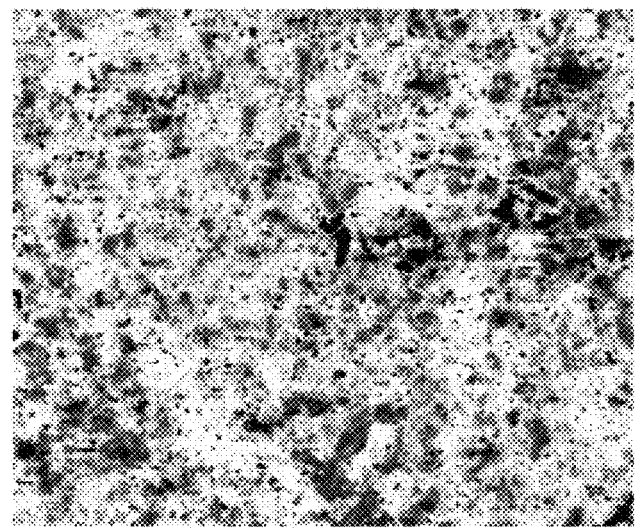
FIG. 5b illustrates the SEM image of 30% by wt Cu-cermet with 5% by wt flour after reduction, sintered at 950° C. for 3 hours in air.
Figure 6A:
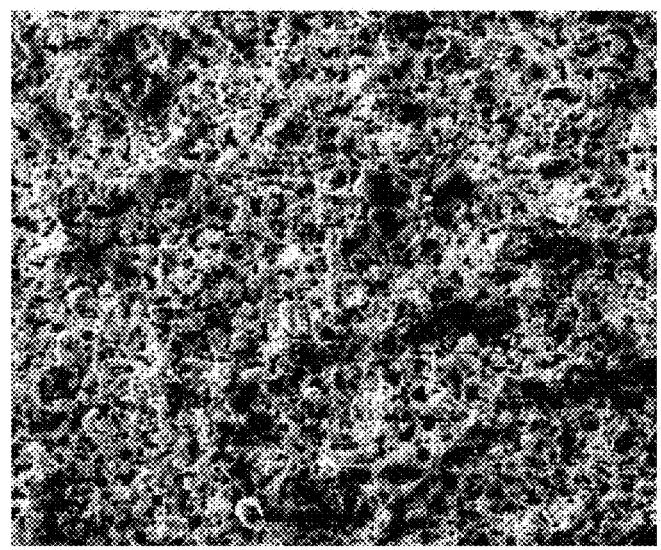
FIG. 6a illustrates the SEM image of 40% by wt Cu-cermet with 5% by wt flour before reduction.
Figure 6B:
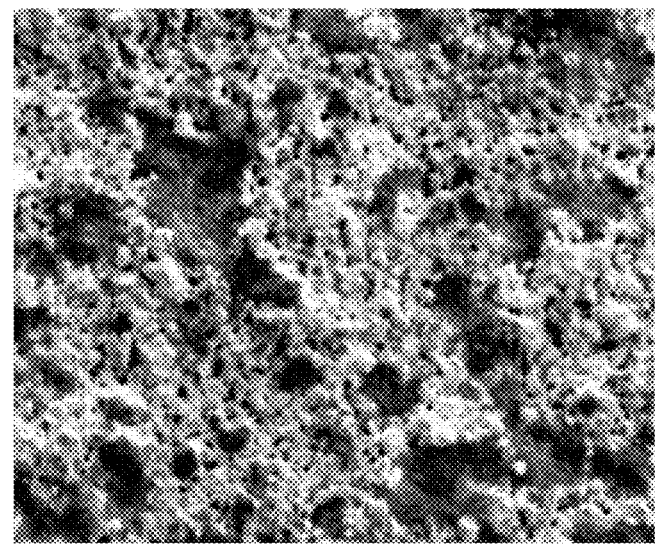
FIG. 6b illustrates the SEM image of 40% by wt Cu-cermet with 5% by wt flour after reduction.
Figure 7A:
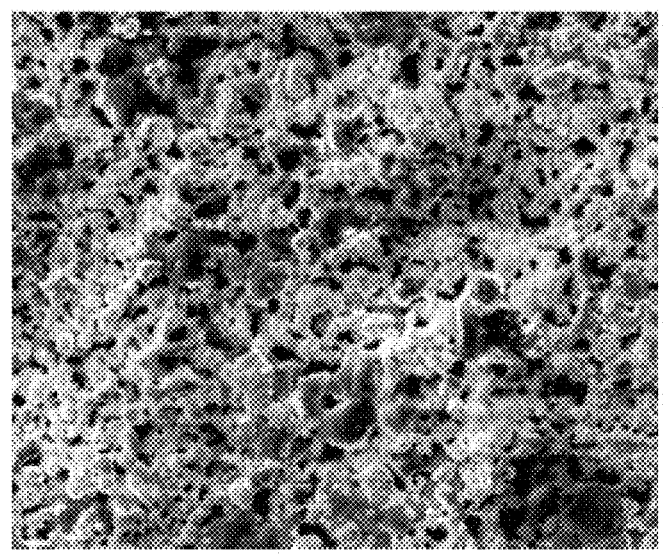
FIG. 7a illustrates the SEM image of 40% by wt Cu-cermet with 10% by wt flour before reduction.
Figure 7B:
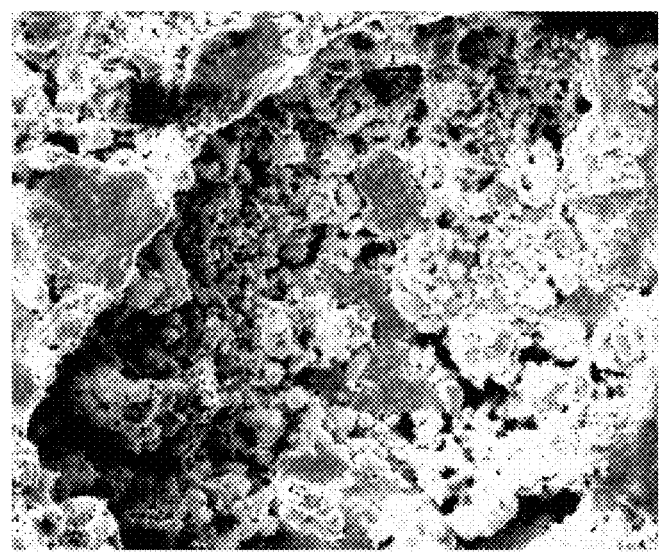
FIG. 7b illustrates the SEM image of 40% by wt Cu-cermet with 10% by wt flour after reduction.

FIG. 4a and FIG. 4b illustrates the X-ray Diffractograms of 30% by wt Cu-cermet before and after reduction respectively. Notations for FIG. 4a and FIG. 4b are given below:

A. A.PDFCard-$BaCeO_3$-00-001-0803
B. PDF Card-Cu-00-004-0836
C. C1.PDF Card-CuO-01-070-6829
D. 1PDF Card-$Ba_2Cu_3YO_7$-00-038-1433
E. Y.PDF Card-01-071-0049

The various phases identified before reduction are same as after sintering shown in FIG. 3, the various phases were; $BaCeO_3$, CuO and $Ba_2Cu_3YO_7$ (minor phase). Similarly various phases identified after reduction by butane flame were; $BaCeO_3$, Cu, $Y_2O_3$, $Ba_2Cu_3YO_7$. Only CuO was reduced to Cu metal as evident from FIG. 3 and the rest of the phases were the same as after sintering.

The various properties of the 20% by wt, 30% by wt and 40% by wt Cu based cermets are analyzed as discussed below.

The SEM images of 20% by wt, 30% by wt and 40% by wt Cu-cermets with 5% by wt and 10% by wt flour sintered at 950° C. for 3 hours before and after reduction of $Cu_2O$ to Cu are shown in FIG. 5a, FIG. 5b, FIG. 6a, FIG. 6b, FIG. 7a and FIG. 7b respectively. The SEM images were taken with the help of Vega pental Fet ×3 Scanning Electron Microscope at various magnifications. The morphology of the pores is relatively uniform while the average pore size is roughly of the order 2 µm. This shows that the material is macro-porous. This bigger pore size is due to relatively big grain size. There are some voids as well as obvious from FIG. 4, an insight of such a void is shown in FIG. 7 at a magnification of 2000.

The average grain size of Cu-based cermet is in the range 2-5 µm and its size is relatively uniform as shown in FIG. 6a, FIG. 6b, FIG. 7a and FIG. 7b.

The black grains in FIG. 6a, FIG. 6b, FIG. 7a and FIG. 7b shows interconnected CuO grains, whose distribution in not very uniform. CuO grains are relatively bigger than ceramic grains of the order 4-5 µm as clear from FIG. 7a and FIG. 7b before reduction. This non uniform distribution may be due to using small cylindrical rods of cuprous oxide as precursor. After reduction of CuO to Cu metal, Cu looks like melted as clearly shown in FIG. 7a and FIG. 7b. This may be due to high temperature and intensity of butane flame. The pore and grain sizes before and after reduction are almost the same, as evident from FIG. 6a, FIG. 6b, FIG. 7a and FIG. 7b.

Figure 8:
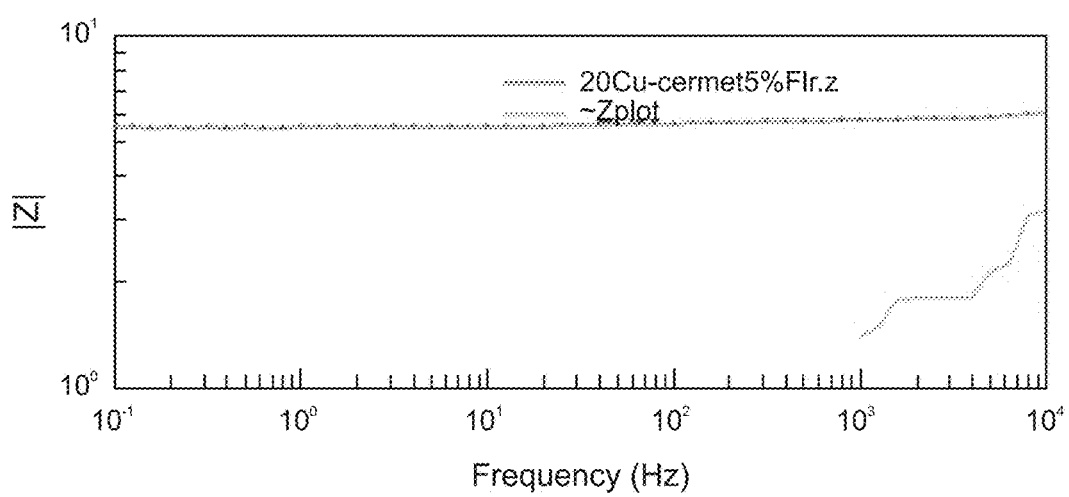
FIG. 8 illustrates the Electrical Impedance of a typical 20% by wt Cu-cermet with 5% by wt flour at room temperature.

Further, the impedance of the reduced Cu-cermets with 5% by wt and 10% by wt flour was measured with Solatron Electrochemical Impedance Spectrometer (EIS) in the frequency range 0.1-104 Hz at room temperature. A stable Impedance graph of a typical 20% by wt Cu-cermet with 5% by wt flour in the frequency range $0.1$-$10^4$ Hz is shown in FIG. 8. The decrease in resistivity was observed with increased copper loading due to high electrical conductivity of copper.

The DC Resistances at high temperatures were obtained using two butane flames. Platinum wire was used for contact and small pressure was applied to enhance the electrical contact. The edges of Platinum wire in contact with the sample were flattened to ensure good contact.

K type thermocouple was used to record the thermoelectric voltage. This was converted to equivalent temperature using Table for Type K Thermocouple. The sample was heated up to 650° C. and then cooled slowly and the corresponding resistance at various temperatures e.g. 650° C., 600° C. till 50° C. was measured.

Figure 9:
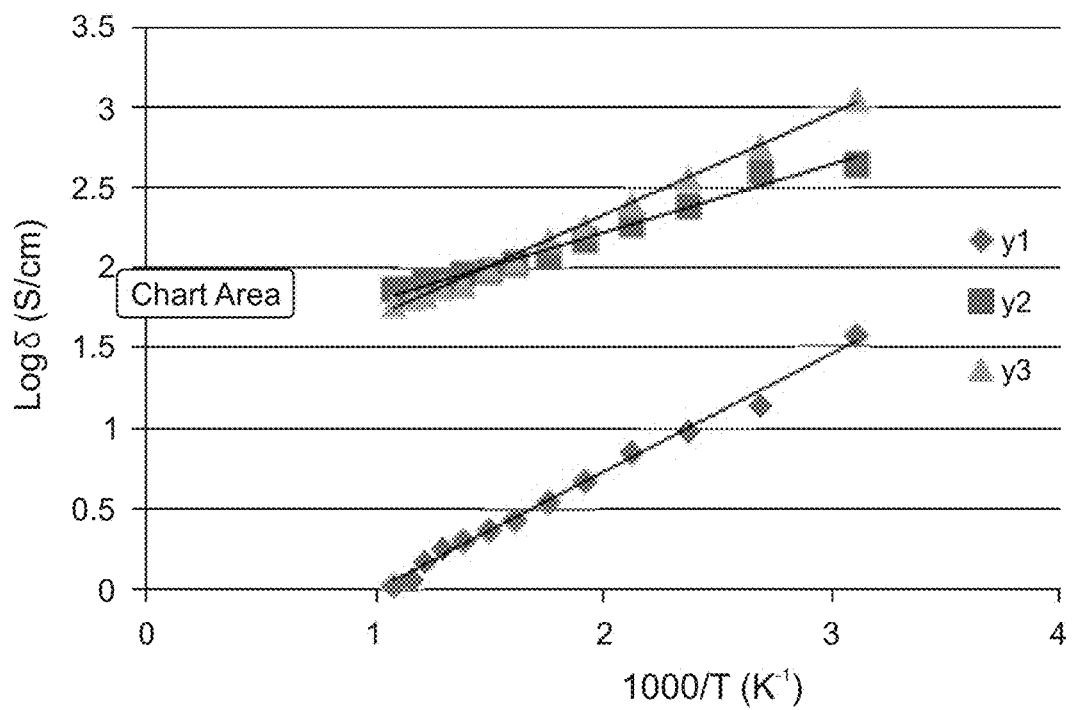
FIG. 9 illustrates an Arrhenius plot for total electrical conductivity of 20% wt, 30% wt, 40% by wt Cu cermets represented by y1, y2 and y3 respectively.

The Resistivities at room and high temperatures were calculated. The conductivity σ (S/cm) was calculated as reciprocal of resistivity. FIG. 9 illustrates an Arrhenius plot for total electrical conductivity of 20% by wt, 30% by wt and 40% by wt Cu cermets represented by y1, y2 and y3 respectively. It shows that the electrical conductivity decreases with increase in temperature for all the samples. The conductivity of 20% by wt Cu-based cermet anode material is roughly 3 orders of magnitude lower than 30% by wt and 40% by wt Cu-cermets. This may not be a potential anode material. Nevertheless, conductivity for 30% by wt and 40% by wt Cu-cermets is very high. There is some small difference in conductivities at lower temperatures; however at higher temperatures, the conductivities are quite close to each as can be clearly seen in clear in FIG. 9. The conductivities of 20% by wt and 30% by wt Cu-cermets in the temperature range i.e. 650-700° C. are ~60-80 S/cm, which are very acceptable values for potential anode for solid oxide fuel cells. The activation energies obtained from FIG. 9 from the log σ vs 1/T plot assuming that the electrical conductivity follows the relation $\sigma=\sigma_0\exp-E_a/kT$ where k is the Boltzmann's constant are 0.108 eV for the 40-Cu cermets, 0.120 eV for the 30-Cu cermets and 0.29 eV for the 20-Cu cermets.

Figure 10:
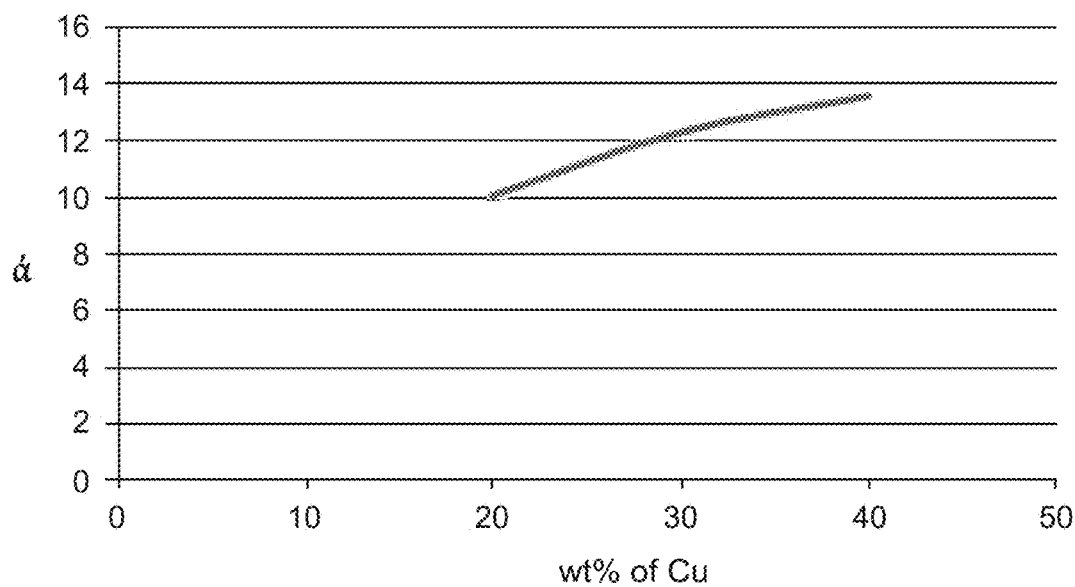
FIG. 10 shows the variation of the mean coefficient of thermal expansion a with 20, 30 and 40% by wt Cu-cermets in He atmosphere in the temperature range 500-600° C.

The thermal expansion (CTE) was measured with Setaram Thermomechanical Analyzer (TMA). The samples were heated up to 800° C. at a heating rate of 10° C./minute in helium atmosphere. The variation in the mean coefficient of thermal expansion, α, for 20, 30 and 40% Cu cermets in He atmosphere in the temperature range of 500-600 C is shown in FIG. 10. An increase in a was observed with increasing copper loading and also with increase in temperature. The increase in a with copper loading is almost linear. This is due to the higher α value of copper than the ceramic composition in the Cu-cermet. For 30% by wt Cu-cermet, α is approximately $12\times10^{-6}/°$ C.

What is claimed is:

1. A method for preparing a cermet body comprising a ceramic component and a metallic component, the method comprising:
   a. weighing and calcinating the ceramic component, wherein the ceramic component comprises a mixture of at least four oxides selected from the group consisting of Barium oxide, Cerium oxide, Yttrium oxide, Zirconium oxide and Ytterbium oxide;
   b. milling the ceramic component in an organic solvent with a milling media followed by drying;
   c. calcinating the dried ceramic component;
   d. repeating steps (b) and (c) to form a calcined ceramic powder;
   e. mixing the calcined ceramic powder with a porogen to form a ceramic powder mixture;
   f. compacting the ceramic powder mixture by using uniaxial compaction at 5000 psi to form a ceramic body in the form of pellets followed by sintering the pellets at 950° C. for 3 hours to form a sintered porous ceramic body, wherein the sintered porous ceramic body has pores created based on sintering of the porogen; and
   g. impregnating the sintered porous ceramic body with the metallic component to form a cermet body, wherein the metallic component comprises at least one metal selected from the group consisting of Iron, Copper, Nickel, alloys of the aforementioned metals and mixtures thereof; wherein the ceramic component is in the range of 5% by weight to 95% by weight of the cermet body.

2. The method according to claim 1, wherein the Barium oxide is in the range of 20% by weight to 50% by weight of the ceramic component.

3. The method according to claim 1, wherein the Cerium oxide is in the range of 35% by weight to 50% by weight of the ceramic component.

4. The method according to claim 1, wherein the Yttrium oxide is in the range of 10% by weight to 20% by weight of the ceramic component.

5. The method according to claim 1, wherein the Zirconium oxide is in the range of 5% by weight to 10% by weight of the ceramic component.

6. The method according to claim 1, wherein the Ytterbium oxide is in the range of 10% by weight to 20% by weight of the ceramic component.

7. The method according to claim 1, wherein the organic solvent is ethanol.

8. The method according to claim 1, wherein the milling media is alumina.

9. The method according to claim 1, wherein the metallic component is in the range of 5% by weight to 50% by weight of the cermet body.

10. The method according to claim 1, wherein the metallic component impregnated in the ceramic component is in molten form or is a metallic salt.

11. The method according to claim 1, wherein the porogen is selected from starch and flour.

12. The method according to claim 1, wherein the cermet body is formed after the impregnation by fusing the metallic component with the sintered porous ceramic body due to sintering from 1350° C. to 1500° C.

* * * * *